(12) United States Patent
Heinrich et al.

(10) Patent No.: US 8,092,214 B2
(45) Date of Patent: Jan. 10, 2012

(54) METHOD FOR CONTINUOUS MIXING AND MELTING INORGANIC SALTS AND FURNACE INSTALLATION FOR REALIZING THE METHOD

(75) Inventors: Michel Heinrich, Bammental (DE); Hans-Helmut Trapp, Erlensee (DE)

(73) Assignee: Durferrit GmbH, Mannheim (DE)

( * ) Notice: Subject to any disclaimer, the term of this patent is extended or adjusted under 35 U.S.C. 154(b) by 961 days.

(21) Appl. No.: 12/076,844

(22) Filed: Mar. 24, 2008

(65) Prior Publication Data
US 2008/0233527 A1    Sep. 25, 2008

(30) Foreign Application Priority Data
Mar. 24, 2007  (DE) .................. 10 2007 014 230

(51) Int. Cl.
*F27B 3/00*  (2006.01)
(52) U.S. Cl. ........................ 432/161; 432/215
(58) Field of Classification Search .................. 432/161, 432/162, 214, 215, 97
See application file for complete search history.

(56) References Cited

U.S. PATENT DOCUMENTS

| | | | | |
|---|---|---|---|---|
| 1,466,637 A | * | 8/1923 | Babb ...................... | 126/343.5 A |
| 2,571,342 A | * | 10/1951 | Crowley, Jr. .................. | 208/55 |
| 3,829,310 A | * | 8/1974 | Mahy ............................. | 75/368 |
| 3,958,936 A | * | 5/1976 | Knight, Jr. ................... | 422/243 |
| 4,042,318 A | * | 8/1977 | Franke et al. ................ | 432/210 |
| 4,067,736 A | * | 1/1978 | Vartanian ..................... | 420/425 |
| 4,149,876 A | * | 4/1979 | Rerat .............................. | 75/363 |
| 4,255,129 A | * | 3/1981 | Reed et al. ..................... | 432/13 |
| 4,590,043 A | * | 5/1986 | Sanjurjo ...................... | 117/223 |
| 6,074,455 A | * | 6/2000 | van Linden et al. ............ | 75/414 |
| 6,084,903 A | * | 7/2000 | Fukushima et al. ......... | 373/121 |
| 6,086,361 A | * | 7/2000 | Higashi et al. ............... | 432/161 |
| 2005/0005646 A1 | | 1/2005 | Leister et al. | |

FOREIGN PATENT DOCUMENTS

| | | | |
|---|---|---|---|
| JP | 02070029 A | * | 3/1990 |
| JP | 11 325739 A | | 11/1999 |

OTHER PUBLICATIONS

European Office Action dated Mar. 24, 2010, issued in related European Patent Application No. 07 021 605.6-1215, and an English-language translation.
European Search Report dated Aug. 4, 2009, issued in related European Patent Application No. 07 02 1605.6-1215, and an English-language translation.

(Continued)

Primary Examiner — Gregory A Wilson
(74) Attorney, Agent, or Firm — Venable LLP; Robert Kinberg; Leigh D. Thelen

(57) ABSTRACT

The invention relates to a method for the continuous melting of inorganic salts and a furnace installation for realizing the method. Solid salts are fed into a furnace with the aid of a feeding unit. The salts contained in the furnace are heated. A flow of the salts is generating inside the furnace with the aid of a circulating unit. The flow generates a two-phase region containing solid and melted salt and a separate second region containing substantially solely a melt that is heated to the desired temperature. The melt is discharged from the separate second region simultaneous with the feeding of the solid salts into the furnace with the aid of a removal unit.

32 Claims, 4 Drawing Sheets

OTHER PUBLICATIONS

Bielefelder Verlag GmbH & Co., KG, "Sonne, Wind and Wärme (Sun, Wind and Energy)", [on line], 11 (2004) 54-56; retrieved from www.sunindenergy.com/swe/content/archiv/archiv.ph?showall=1, printed on Mar. 24, 2008.
FLAGSOL GmbH 2008, "Andasol Projects" [on line]; in priority document DE 10 2007 014 230.9 dated Mar. 24, 2007; retrieved from http://www.flagsol.com/andasol_projects.htm, printed on Mar. 24, 2008.
Solar Millenim AG [online], cited in priority document DE 10 2007 014 230.9 dated Mar. 24, 2007; retrieved from http://www.solarmillenium.de, printed on Mar. 24, 2008.

* cited by examiner

METHOD FOR CONTINUOUS MIXING AND MELTING INORGANIC SALTS AND FURNACE INSTALLATION FOR REALIZING THE METHOD

CROSS-REFERENCE TO RELATED APPLICATION

This application claims the priority of German Patent Application DE 10 2007 014 230.9, filed on Mar. 24, 2007, the subject matter of which is incorporated herein by reference.

BACKGROUND

The invention relates to a method for the continuous melting of inorganic salts and to a furnace installation for realizing the method.

Melted inorganic salts of the type under discussion are used in different industrial plants as a heat-storage medium or as a heat-transfer medium. The melted inorganic salts are used in particular for storing heat in solar power plants or other thermal power plants. They are designed to store excess amounts of heat from ventilation systems, as well as for the transfer of heat (i.e., heating) or the dissipation of heat (i.e., cooling) in industrial-size chemical reactors.

As compared to organic heat storage or heat transfer media, melted inorganic salts have the advantage of having an extremely high thermal capacity (specific heat) and can be used at high temperatures since they have a low tendency to decompose and a high evaporation point. Inorganic salts are furthermore cheap and available worldwide.

Melted inorganic salts can be used as thermal storage media for the process of generating electrical energy in solar power plants, which has seen a considerable increase in recent years [Bielefelder Verlag GmbH & Co. KG, "Sonne, Wind und Wärme (Sun, Wind and Energy)" [online], 11 (2004) 54-56, [retrieved on Feb. 21, 2008] Retrieved from http://www.sunwindenergy.com/swe/content/archiv/ar-chiv.ph p?showall=1; FLAGSOL GmbH 2008, "Andasol Projects" [online], [retrieved on Feb. 21, 2008] Retrieved from http://www.flagsol.com/andasol_projects.htm; Solar Millenim AG [online], [retrieved on Feb. 21, 2008] Retrieved from http://www.solarmillenium.de].

The storage of energy produced with solar technology represents a special challenge because the production of this electrical energy must also be ensured during the night.

Liquefied mixtures of potassium nitrate (KNO3) and sodium nitrate (NaNO3) at a ratio of 40/60% by weight (melting point approximately 250° C.) can be used for this purpose, wherein this liquid mixture is stored in extremely large, thermally insulated storage containers. During the day, the melted salt mixture is heated to a high temperature $T_1$, for example to 400° C., with the aid of concentrated energy from the sun and is stored inside a hot tank. During the night, the hot salt melt is removed from the hot tank and is conducted over a heat-exchanger system, wherein a portion of the stored energy is used for producing electricity with the aid of steam turbines. In the process, the salt melt cools down again to a temperature $T_2$, for example 290° C., and is then stored while still in the liquid form in a cold tank, approximately at a temperature of 290° C. During the following day, the salt melt is again heated up to the high temperature of 400° C. by a portion of the irradiating energy from the sun, whereupon it is again transferred to the hot tank and the cycle can repeat itself.

The storage tanks of industrial solar power plants, which have a capacity of approximately 50 megawatt and can hold approximately 30,000 tons of the melted storage salt, have dimensions in the order of 30 m in diameter and 15 to 20 m in height.

The salt or the salt mixture must be heated at least to the temperature of the cold tank for the operational start-up of such a heat-storage system.

In concrete terms, it means that for the start-up of a solar power plant with approximately 50 megawatt capacity, an amount of 30,000 tons of the aforementioned potassium/sodium nitrate mixture must be heated to 290°-300° C. and stored inside an insulated storage tank.

Traditional melting furnaces or heaters inside the container cannot be used for melting such large amounts of inorganic salts or salt mixtures in the crystalline form of the crude material. The attempt to melt such large amounts of salt inside a container would only result in a localized melting because of the poor heat conduction of the crystalline crude materials. Otherwise it would take an unrealistically longtime until the total salt amount would be melted.

SUMMARY

It is an object of the present invention to provide a method for the continuous melting of inorganic salts and a furnace installation for realizing the method.

The above and other objects are accomplished according to one aspect of the invention wherein there is provided a method for melting inorganic salts which includes, according to one embodiment: a method for continuously melting inorganic salts, the method comprising: feeding solid salts into a furnace with the aid of a feeding unit; heating the salts contained in the furnace; generating a flow of the salts inside the furnace with the aid of a circulating unit, wherein the flow generates a two-phase region containing solid and melted salt and a separate second region containing substantially solely a melt that is heated to the desired temperature; and discharging of the melt from the separate second region simultaneous with the feeding of the solid salts into the furnace with the aid of a removal unit.

According to another aspect of the invention, the above and other objects are accomplished wherein there is provided a method for installing a furnace which includes, according to one embodiment: a furnace; a feed unit to feed solid salts into the furnace; a heater to heat the salts contained in the furnace; a circulation unit to generate a flow of the salts inside the furnace to cause a separation between a two-phase region of solid and melted salts and a second region of a melt that is heated to a desired temperature; and a removal unit to remove melt from the second region, simultaneous with operation of the feed unit.

One essential precondition for the function of the system according to the invention is the separation of a two-phase region containing solid salt and melted salt from a second region containing the melt which is heated to a specific temperature. As a result, it is ensured that the melt that is removed via the discharge unit from the second region does not contain non-melted salt components, meaning the fed-in solid salt is retained in the two-phase region.

One advantage of the invention is that the separation between the region containing the melt and the two-phase region is ensured with the aid of flow-technical measures, so that the mechanical expenditure can be kept low.

It is particularly advantageous if the circulating unit generates in the center of the furnace a vertically upward directed and preferably laminar flow, which allows retaining the solid salts, fed-in via the feed unit, in the two-phase region. A flow of this type can be generated with a structurally simple design by using a circulating unit in the form of a stirring mechanism or a pump. Alternatively, or in addition thereto, a nozzle arrangement can also be provided in the bottom region of the furnace through which an upward-directed gas flow can be introduced into the furnace. Advantageous guide elements can be installed in the furnace to support this flow. In the simplest case, a guide element of this type is embodied as a guide cylinder, which is open at the top and at the bottom, surrounds the circulating unit, and has an axis of symmetry that is preferably coaxial to the axis of symmetry of the furnace. The vertically upward directed flow is focused and concentrated by the surrounding guide cylinder. The upper edge of the guide cylinder furthermore functions as a means for deflecting the mass flowing over the edge in an upward direction, so that it subsequently flows in a downward direction in the edge region of the furnace.

This flow furthermore aids the separation between the region holding the melt and the two-phase region. This occurs because in the central region of the furnace, the solid salts supplied via the feed-in unit and preferably also via the furnace ceiling, initially reach the region of the upward-directed flow generated by the circulation unit and are thus kept in the two-phase region. Even following the deflection at the upper edge of the cylinder, the flowing particles still remain in the two-phase region. The long dwell time of the solid salts in the two-phase region thus ensures that these salts are completely melted before they reach the second region located below the two-phase region. As a result, it is ensured that the second region only contains pure melt and no solid salts.

The melt heated to the desired temperature is then discharged from this region. In the simplest case, a drain in the form of a valve can be provided in the bottom area for removing the melt. For reasons of handling and space, however, it is often desirable to feed in the solid salts and discharge the melt by way of the ceiling. In that case it is advantageous to use probe-like removal devices, which project from above into the second region, such as liquid siphons and especially mammoth pumps.

A control unit is advantageously provided for controlling the operation of the furnace installation. In dependence on input variables generated with the aid of suitable measuring systems, the control unit controls the feed-in of the solid salt as well as the discharge of the melt. In the process, the feed-in as well as the discharge can take place continuously or intermittently, meaning at predetermined time intervals. The operation is preferably controlled such that during the operation of the furnace installation, the salt mass inside the furnace remains at least approximately constant. The control must furthermore prevent the accumulation of excessive amounts of solid salts inside the furnace, relative to the share of melt.

The furnace installation according to the invention is preferably used for melting salt mixtures, wherein these melts can be used advantageously as thermal storage or heat transfer medium in installations such as solar power plants. The individual salts can be fed separately or pre-mixed via the feed-in unit into the furnace. The circulating unit within the furnace ensures a complete mixing of the individual components, meaning no separate units are required for mixing the components.

BRIEF DESCRIPTION OF THE DRAWINGS

The present invention will be more readily understood from the following detailed description when read in conjunction with the accompanying drawings, in which.

DETAILED DESCRIPTION

Figure 1:
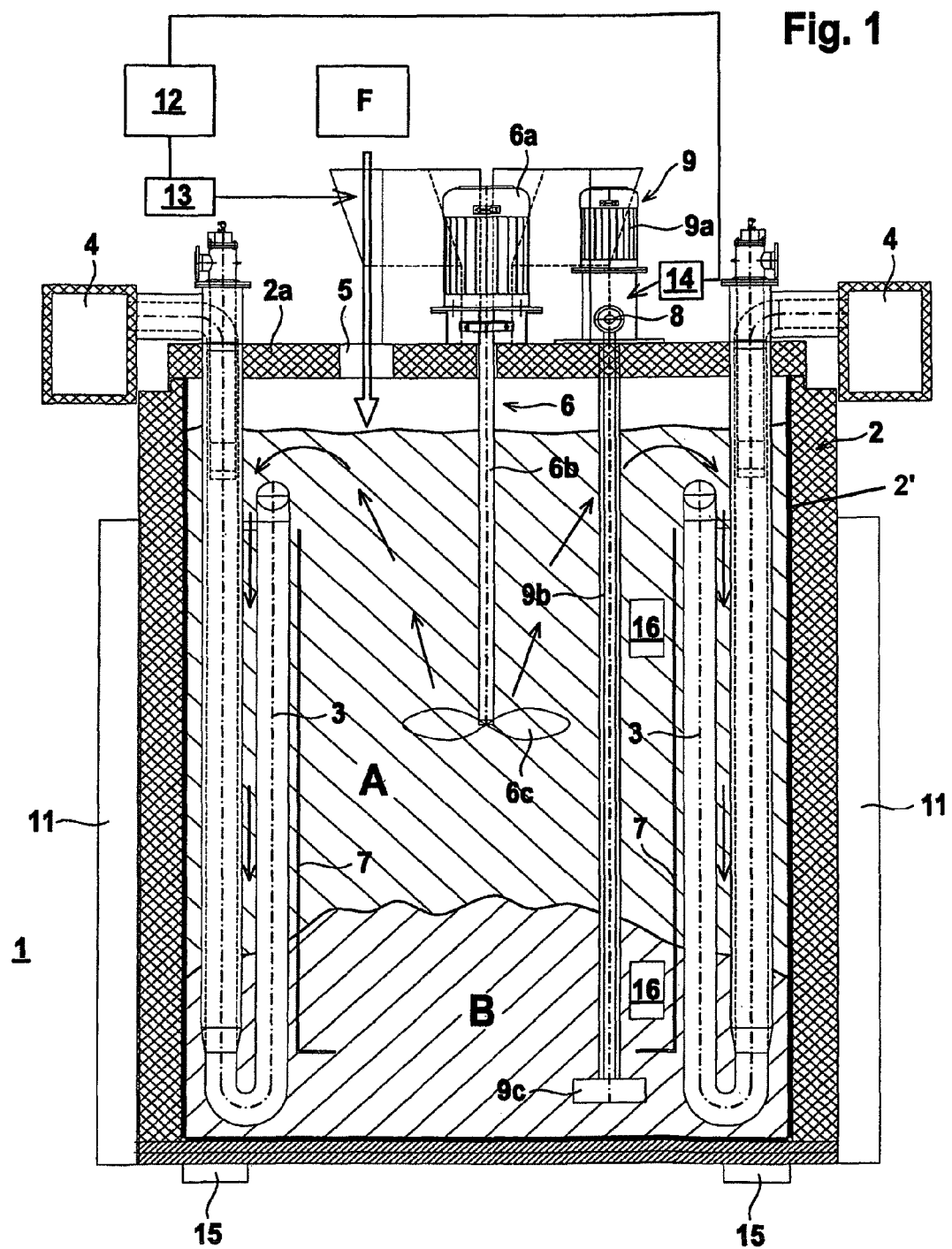
FIG. 1 is a longitudinal section through a first embodiment of a furnace installation for melting and mixing of inorganic salts.
Figure 2:
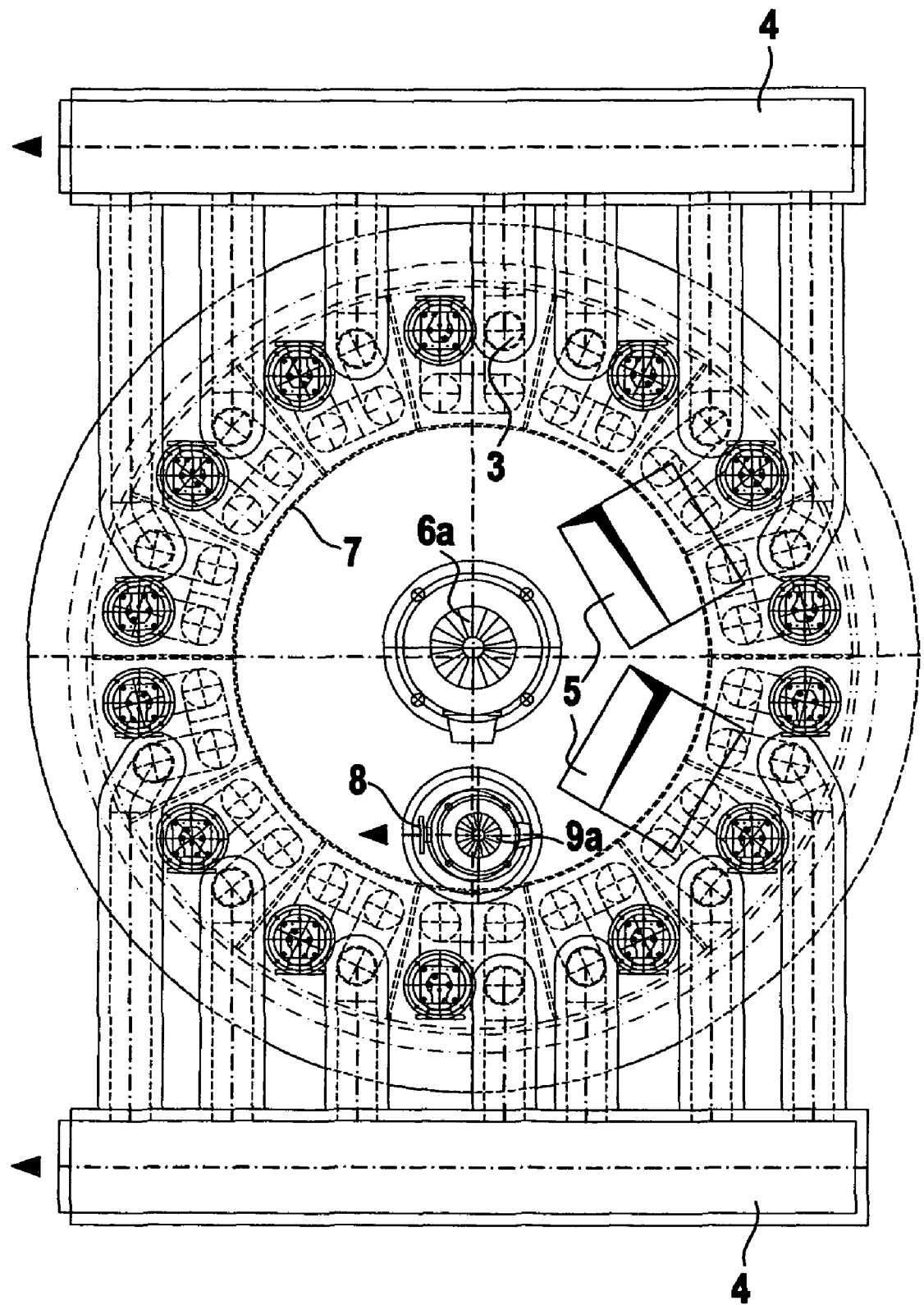
FIG. 2 is a cross section of the furnace installation according to FIG. 1.

FIGS. 1 and 2 illustrate an embodiment of a furnace installation 1, used for the continuous mixing and melting of inorganic salts. For the present embodiment, a salt mixture of potassium nitrate and sodium nitrate, at a ratio of 40/60% by weight, is melted inside a furnace installation 1. The furnace installation 1 comprises a furnace 2 having inside walls 2' in which the salt mixture is heated to a desired temperature of approximately 290° C., wherein the melting point for the salt mixture is near 250° C.

The furnace 2 essentially consists of a circular-cylindrical crucible which accommodates the salt mixture. Gas-heated tubular heating elements 3, so-called radiation tubes, are used in this embodiment for heating up the salt mixture. These radiation tubes are connected to gas discharge tubes 4 for discharging the gas. The tubular heating elements 3 are located on the inside of the furnace 2 and form a ring-shaped arrangement that is symmetrical with respect to a central axial plane parallel to the gas discharge tubes 4. The tubular heating elements 3 in this case are arranged directly in front of the inside walls 2' of the furnace 2. Additional heating elements 11 are furthermore provided on the outside of the furnace 2.

Alternatively, or in addition thereto, the furnace 2 can also be heated with heating elements that are arranged outside of the furnace 2, wherein gas, oil, heavy oil or electrical energy is generally used for heating the furnace 2.

Feed openings 5 in the ceiling 2a of the furnace 2 are used for feeding in crystalline or pelletized salt. A feed-in unit F that is not shown in further detail herein can be used to feed in the solid salts, wherein this feed-in unit can take the form of proportioning screws, vibrating metering devices, belt conveyors, or chain conveyors. The individual salts can be fed into the furnace 2 via the feed-in unit F, either pre-mixed or separately.

A circulation unit is furthermore integrated into the furnace 2, which makes possible the complete mixing of the salts fed into the furnace 2. The circulation unit in the present embodiment is a stirring mechanism 6, which is provided with a drive 6a that is mounted on the ceiling 2a of the furnace 2 and a shaft 6b which projects from the drive 6a and into the furnace 2. The free end of the shaft is provided with a stirring tool 6c, for example a propeller shaped stirrer, that is rotated via the drive 6a. The shaft 6b extends along the axis of symmetry for the furnace 2.

In general, the circulation unit within the furnace 2 generates a laminar and vertically upward directed flow. To increase and support this flow, a guide cylinder 7 is provided as a guide element, which is open at the top and bottom and is arranged coaxially with the shaft 6b of the stirring mechanism 6. The direction of the flow generated with the circulation unit is indicated with arrows in FIG. 1. The vertically upward directed flow is generated in the center of the furnace 2, within the guide cylinder 7. The upward flowing salt mixture flows around the upper edge of the guide cylinder 7 where it is deflected, so that a downward directed flow results in the edge regions of the furnace 2.

The flow generated by the circulation unit not only results in a complete mixing of the salt mixture, but also aids in the separation of a two-phase region of solid and melted salt (reference A in FIG. 1) from the underneath-arranged second region containing homogeneous and completely mixed melt (reference B in FIG. 1). This separation is achieved because the solid salts are fed into the furnace 2 via the feed openings 5, in the region of the upward directed flow. As a result of this upward-directed flow, the solid salts are kept in the two-phase region and can melt completely before they reach the second region via the downward-directed flow in the edge regions of the furnace 2.

The separation of the two regions can be preset by precisely specifying the direction and strength, meaning the speed, of the flow. In the present embodiment, the dimensions for the stirring mechanism 6 and the guide cylinder 7 function as adjustment parameters.

A removal unit is used for discharging the melt from the second region. In the simplest case, a valve is arranged in the bottom of the furnace 2 through which the melt flows out. The removal unit for the preferred embodiment is designed such that the melt is discharged via a discharge opening 8 in the ceiling 2a of the furnace 2. The removal unit can be embodied as a liquid siphon, for example in the form of a mammoth pump, wherein the present removal unit is embodied as a circular pump 9. This pump is equipped with a drive 9a and at least one tube 9b for suctioning up melt from the bottom area of the furnace 2 via a probe 9c and subsequently pumping the melt off toward the top.

The operation of the furnace installation 1 is controlled via a central control unit 12. The control unit 12 initially controls the temperature in order to heat the melt to the desired temperature. A temperature measuring unit 16 comprising thermal elements is provided inside the furnace 2 for detecting the temperature of the melt, especially in the second region. The heating capacity of the tubular heating elements 3 is controlled in dependence on the values measured at the thermal elements.

The control unit furthermore controls the amounts of solid salt fed in during each time unit, as well as the amount of homogeneous melt discharged during each time unit. The furnace installation 1 thus utilizes a flow-through operation, such that the feeding of solid salts into the furnace 2 and the discharge of melt from the furnace 2 occur parallel and continuously. The feed-in and discharge processes can be continuous or intermittent, meaning during predetermined time intervals.

The first input variables determined for the central control unit are the solid salt amounts fed into the furnace 2 via the feed-in unit F during each time unit. The solid salt amounts may be measured by a measuring system in the form of, for example, gravimetric or volumetric measuring units 13, in particular weighing cells in the feed-in unit F. The second input variable determined with the aid of a measuring unit 14 for the central control unit 12 is the amount of melt that is discharged during each time unit via the discharge unit. In the present embodiment, the energy absorption of the circular pump 9 must be determined for this, wherein the flow speed of the discharged melt can generally also be determined as a measuring variable. Finally, the total weight of the furnace 2 with the melt contained therein is determined as an additional input variable by using a weighing unit 15, e.g. in the form of weighing cells.

The control unit controls the feed-in unit F and the discharge unit so that the weight of the furnace 2 and thus the amount of melt contained inside the furnace 2 remain approximately constant.

The feed unit F and the discharge unit are furthermore controlled via the control unit so that the amount of salt supplied during each time unit and the amount of melt discharged during each time unit, relative to the total mass inside the furnace 2 and relative to the time required for melting the solid salts, does not exceed a predetermined limit value. As a result, it is prevented that excessive amounts of solid salt are fed into the furnace 2, which would result in an undesirable interference with the second region containing the homogeneous melt in the furnace 2.

For the present embodiment and a typical holding capacity of 60 tons for the furnace 2, it has proven advantageous if the amount of solid salt fed in per hour and, at the same time, the amount of melt simultaneously discharged from the furnace 2 per hour do not exceed 100% by weight (meaning a complete furnace filling), preferably 25% by weight, of the furnace 2 content. In the present embodiment, the amount of salt fed in per hour and the amount of melt pumped-out per hour are respectively controlled to be 15 tons.

Figure 3:
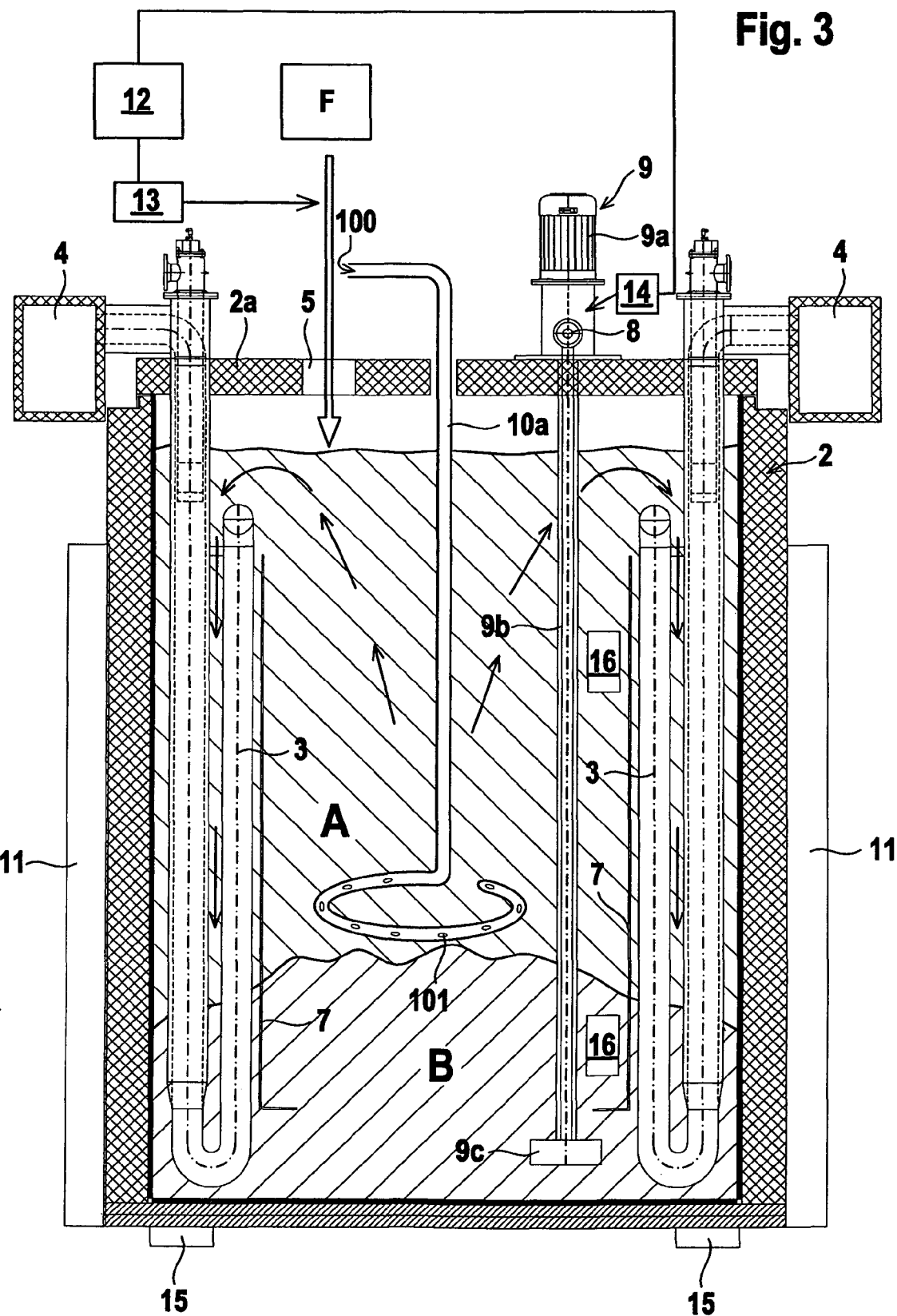
FIG. 3 is a longitudinal section through a second embodiment of a furnace installation for melting and mixing inorganic salts.

FIG. 3 shows a second embodiment of the furnace installation 1. This embodiment is substantially identical to the embodiment according to FIG. 1. The only difference is that the stirring mechanism 6 shown in FIG. 1 is replaced with a nozzle arrangement 10a in the embodiment according to FIG. 3. Compressed air is fed in via an intake 100 of the nozzle arrangement. The air is discharged via nozzle openings 101, thus generating an upward directed flow.

Figure 4:
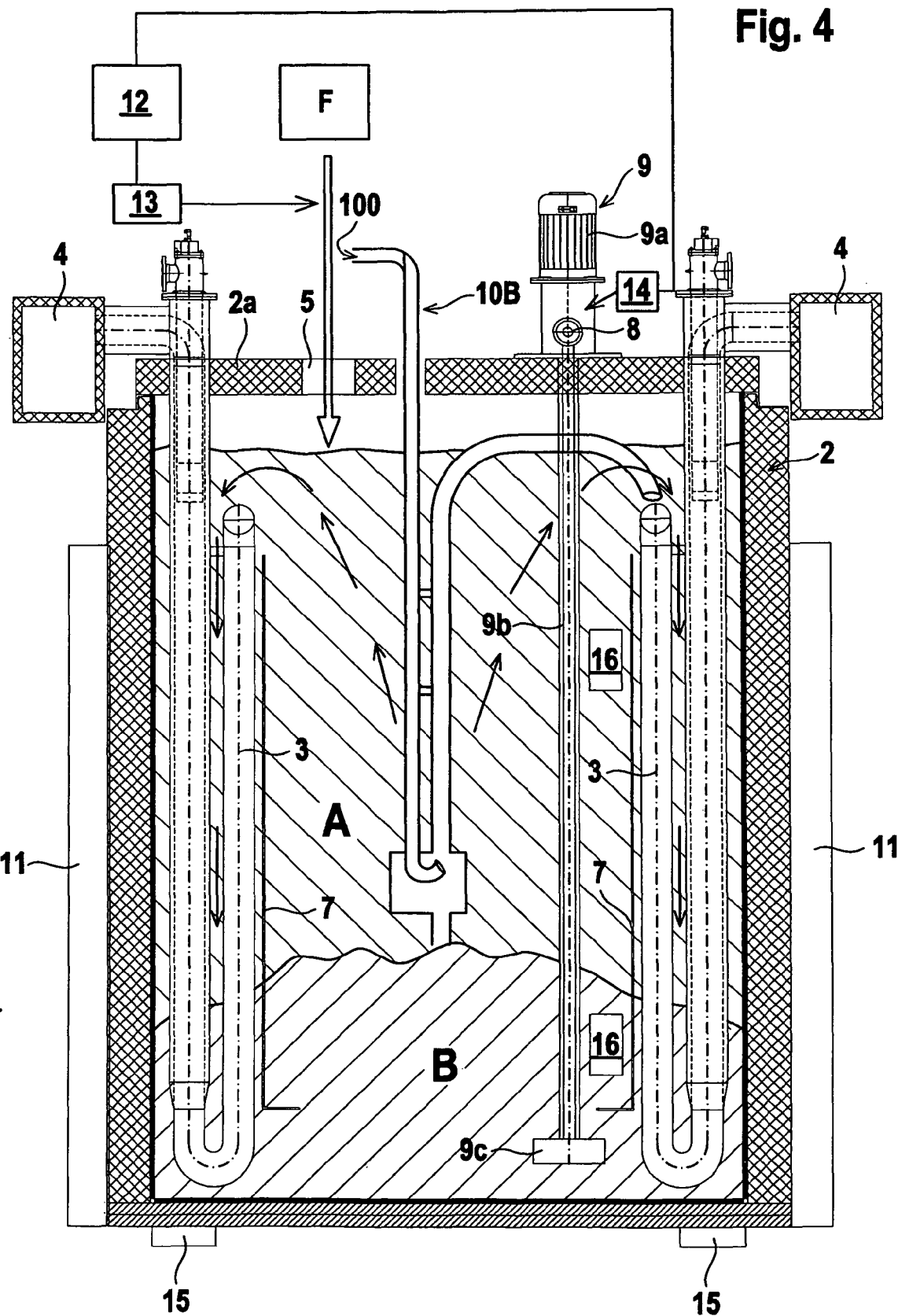
FIG. 4 is a longitudinal section through a third embodiment of a furnace installation for melting and mixing salts.

FIG. 4 shows a third embodiment of the furnace installation. This embodiment is also substantially identical to the one shown in FIG. 1. However, the stirring mechanism 6 of FIG. 1 is replaced with a pump 10B, in particular an air-lift pump.

It will be understood that the above description of the present invention is susceptible to various modifications, changes and adaptations, and the same are intended to be comprehended within the meaning and range of equivalents of the appended claims.

What is claimed is:

1. A method for the continuous melting of inorganic salts, comprising the following steps:
   feeding solid salts into a furnace with the aid of a feeding unit;
   heating the salts contained in the furnace;
   generating a flow of the salts inside the furnace with the aid of a circulating unit, wherein the flow generates a two-phase region containing solid and melted salt and a separate second region containing substantially solely a melt that is heated to the desired temperature;
   discharging the melt from the separate second region simultaneous with the feeding of the solid salts into the furnace with the aid of a removal unit; and
   controlling the amount of the solid salts fed per time unit into the furnace and the amount of the melt removed per time unit from the furnace such that the total weight of the salt amount inside the furnace remains at least approximately constant.

2. A method according to claim 1, wherein the feeding is continuous.

3. The method according to claim 1, wherein the feeding step includes feeding a salt mixture by feeding individual salts separately or pre-mixed via the feeding unit into the furnace; the heating step includes melting the salt mixture inside the furnace; and the generating step includes mixing completely the salt mixture with the aid of the circulating unit.

4. The method according to claim 3, wherein the generating step generates a flow such that the salt mixture present in the second region is completely mixed and melted.

5. The method according to claim 3, wherein the salt mixture includes potassium nitrate and sodium nitrate.

6. The method according to claim 1, wherein the generating step includes determining the separation of the regions by at least one of a direction of the flow, a strength of the flow, or installing mechanical inserts installed in the furnace for guiding the flow.

7. The method according to claim 6, wherein the generating step includes generating a laminar flow with the aid of the circulation unit.

8. The method according to claim 6, wherein the generating step is carried out so that the second region containing the melt is located below the two-phase region.

9. The method according to claim 1, wherein the feeding step and discharging step occur continuously or at predetermined time intervals.

10. The method according to claim 1, wherein said controlling step includes controlling the amount of the solid salts fed per hour into the furnace and the amount of the melt simultaneously removed per hour from the furnace such that the amounts do not exceed 25% by weight of the furnace content.

11. A method for the continuous melting of inorganic salts, comprising the following steps:
    feeding solid salts into a furnace with the aid of a feeding unit;
    heating the salts contained in the furnace;
    generating a flow of the salts inside the furnace with the aid of a circulating unit, wherein the flow generates a two-phase region containing solid and melted salt and a separate second region containing substantially solely a melt that is heated to the desired temperature; and
    discharging the melt from the separate second region simultaneous with the feeding of the solid salts into the furnace with the aid of a removal unit,
    wherein the generating step includes determining the separation of the regions by at least one of a direction of the flow, a strength of the flow, or installing mechanical inserts installed in the furnace for guiding the flow, and
    wherein the generating step includes generating a vertically upward directed flow in the center of the furnace with the aid of the circulation unit, wherein the feeding step includes supplying the solid salts in the central region of the furnace via the feeding unit.

12. The method according to claim 11, wherein the generating step includes generating a downward directed flow in edge regions of the furnace.

13. A method for the continuous melting of inorganic salts, comprising the following steps:
    feeding solid salts into a furnace with the aid of a feeding unit;
    heating the salts contained in the furnace;
    generating a flow of the salts inside the furnace with the aid of a circulating unit, wherein the flow generates a two-phase region containing solid and melted salt and a separate second region containing substantially solely a melt that is heated to the desired temperature;
    discharging the melt from the separate second region simultaneous with the feeding of the solid salts into the furnace with the aid of a removal unit; and
    controlling the amount of the solid salts fed per hour into the furnace and the amount of the melt simultaneously removed per hour from the furnace such that the amounts do not exceed 100% by weight of the furnace content.

14. A furnace installation for the continuous mixing and melting of inorganic salts, comprising:
    a furnace;
    a feed unit to feed solid salts into the furnace;
    a heater to heat the salts contained in the furnace;
    a circulation unit to generate a flow of the salts inside the furnace to cause a separation between a two-phase region of solid and melted salts and a second region of a melt that is heated to a desired temperature;
    a removal unit to remove melt from the second region, simultaneous with operation of the feed unit; and
    a control unit to control the feed-in of the solid salt and the discharge of the melt.

15. The furnace installation according to claim 14, wherein the feeding unit operates continuously.

16. The furnace installation according to claim 14, wherein the circulation unit includes one of a stirring mechanism or a pump with a vertically upward directed flow characteristic.

17. The furnace installation according to claim 14, wherein the circulation unit is arranged in the center of the furnace.

18. The furnace installation according to claim 17, further including guide elements arranged to generate a downward directed flow in edge regions of the furnace.

19. The furnace installation according to claim 14, wherein the heater includes heating elements arranged at least one of inside or outside the furnace to heat the furnace.

20. The furnace installation according to claim 19, wherein the heater employs one of gas, oil, heavy oil, or electrical energy to heat the furnace.

21. The furnace installation according to claim 19, wherein the heating elements arranged inside the furnace comprise gas-fired tubular heating elements.

22. The furnace installation according to claim 21, wherein the furnace has a circular cross section, and the tubular heating elements are arranged in the edge region of the furnace and are ring-shaped.

23. The furnace installation according to claim 14, wherein the removal unit comprises a liquid siphon to remove the melt from the second region.

24. The furnace installation according to claim 23, wherein the liquid siphon is arranged to suction the melt from the bottom region of the furnace.

25. The furnace installation according to claim 14, wherein the removal unit comprises a circular pump.

26. The furnace installation according to claim 14, further comprising a volumetric or a gravimetric measuring unit coupled to the control unit, wherein the measuring unit measures the amount of solid salt fed in via the feeding unit.

27. The furnace installation according to claim 14, further comprising a measuring unit coupled to the control unit, wherein the measuring unit measures the amounts of melt discharged via the removal unit by determining the energy absorption of the removal unit or by determining the flow speed of the melt.

28. The furnace installation according to claim 14, further comprising a weighing unit coupled to the control unit, wherein the weighing unit determines the weight of the furnace that is filled with salts.

29. The furnace installation according to claim 14, further comprising a temperature measuring unit coupled to the control unit, wherein the temperature measuring unit measures the temperature in the two regions inside the furnace.

30. A furnace installation for the continuous mixing and melting of inorganic salts, comprising:
a furnace;
a feed unit to feed solid salts into the furnace;
a heater to heat the salts contained in the furnace;
a circulation unit to generate a flow of the salts inside the furnace to cause a separation between a two-phase region of solid and melted salts and a second region of a melt that is heated to a desired temperature; and
a removal unit to remove melt from the second region, simultaneous with operation of the feed unit,
wherein the circulation unit includes a nozzle arrangement in a bottom region of the furnace to introduce a vertically upward directed gas flow into the furnace.

31. A furnace installation for the continuous mixing and melting of inorganic salts, comprising:
a furnace;
a feed unit to feed solid salts into the furnace;
a heater to heat the salts contained in the furnace;
a circulation unit to generate a flow of the salts inside the furnace to cause a separation between a two-phase region of solid and melted salts and a second region of a melt that is heated to a desired temperature; and
a removal unit to remove melt from the second region, simultaneous with operation of the feed unit,
wherein the circulation unit includes one of a stirring mechanism or a pump with a vertically upward directed flow characteristic, and
wherein the furnace has a ceiling with a feed opening located in the region of the upward directed flow that is generated by the circulating unit, and the feed unit feeds the solid salts into the furnace through the feed opening.

32. A furnace installation for the continuous mixing and melting of inorganic salts, comprising:
a furnace;
a feed unit to feed solid salts into the furnace;
a heater to heat the salts contained in the furnace;
a circulation unit to generate a flow of the salts inside the furnace to cause a separation between a two-phase region of solid and melted salts and a second region of a melt that is heated to a desired temperature;
a removal unit to remove melt from the second region, simultaneous with operation of the feed unit, wherein the removal unit comprises a liquid siphon to remove the melt from the second region; and
a discharge opening for discharging the melt and a drive for operating the liquid siphon, wherein the discharge opening and the drive are arranged above the ceiling of the furnace.

* * * * *